United States Patent
Meininger et al.

(10) Patent No.: US 11,261,821 B2
(45) Date of Patent: Mar. 1, 2022

(54) TORQUE-SLEWING DIESEL ENGINE OPERATION

(71) Applicants: Science Applications International Corporation, Reston, VA (US); Government of the United States, as Represented by the Secretary of the Army, Redstone Arsenal, AL (US)

(72) Inventors: Rik Denis Meininger, Huntsville, AL (US); Bernard Acker, Madison, AL (US)

(73) Assignees: Science Application International Corporation, Reston, VA (US); U.S. Government as Represented by the Secretary of the Army, Redstone Arsenal, AL (US)

( * ) Notice: Subject to any disclaimer, the term of this patent is extended or adjusted under 35 U.S.C. 154(b) by 0 days.

(21) Appl. No.: 17/029,505

(22) Filed: Sep. 23, 2020

(65) Prior Publication Data

US 2021/0017932 A1    Jan. 21, 2021

Related U.S. Application Data

(63) Continuation of application No. 16/411,799, filed on May 14, 2019, now Pat. No. 10,837,396.

(51) Int. Cl.
*F02D 41/40* (2006.01)
*B64D 27/08* (2006.01)
*F02D 35/00* (2006.01)
*F02D 41/08* (2006.01)

(52) U.S. Cl.
CPC ........... *F02D 41/402* (2013.01); *B64D 27/08* (2013.01); *F02D 35/00* (2013.01); *F02D 41/08* (2013.01)

(58) Field of Classification Search
CPC ...... F02D 41/402; F02D 41/08; F02D 41/401; F02D 35/00; F02D 35/028; F02D 2200/501; F02D 2200/70; B64D 27/08; Y02T 10/40
USPC .......... 123/299, 300, 305; 701/103–105, 110
See application file for complete search history.

(56) References Cited

U.S. PATENT DOCUMENTS

| | | | |
|---|---|---|---|
| 4,589,398 A | 5/1986 | Pate et al. | |
| 4,621,599 A | 11/1986 | Igashira et al. | |
| 5,103,645 A | 4/1992 | Haring | |
| 5,231,962 A | 8/1993 | Osuka et al. | |
| 5,609,131 A | 3/1997 | Gray, Jr. et al. | |
| 5,634,447 A | 6/1997 | Rowells | |
| 6,336,447 B1 | 1/2002 | Bartel et al. | |
| 6,378,487 B1 | 4/2002 | Zukouski et al. | |
| 6,382,177 B1 | 5/2002 | Saito | |
| 6,980,903 B2 | 12/2005 | Daniels et al. | |
| 7,464,690 B1 | 12/2008 | Reitz et al. | |

(Continued)

FOREIGN PATENT DOCUMENTS

| | | |
|---|---|---|
| WO | 2009074845 A1 | 6/2009 |
| WO | 2016114683 A1 | 7/2016 |

*Primary Examiner* — Hai H Huynh
(74) *Attorney, Agent, or Firm* — Banner & Witcoff, Ltd.

(57) ABSTRACT

An aircraft diesel engine may be operated at a minimal fuel rate. Shaft output power of the engine may be reduced by initiating combustion during the compression stroke. Combustion may be initiated during the compression stroke by advancing fuel injection, splitting fuel injection, and/or manipulating individual injection quantities. Initiating combustion during the compression stroke may slew torque generation to the compression stroke.

20 Claims, 10 Drawing Sheets

(56) References Cited

U.S. PATENT DOCUMENTS

| | | |
|---|---|---|
| 7,747,379 B2 | 6/2010 | Kita |
| 8,312,860 B2 | 11/2012 | Yun et al. |
| 8,838,364 B2 | 9/2014 | Nagatsu et al. |
| 9,745,914 B2 | 8/2017 | Ochi et al. |
| 9,784,207 B2 | 10/2017 | Ochi et al. |
| 10,358,971 B2 * | 7/2019 | Ochi .................... F02B 23/101 |
| 10,385,798 B2 | 8/2019 | Ochi et al. |
| 10,677,143 B2 * | 6/2020 | Tsumura ................. F02P 15/00 |
| 2011/0192367 A1 | 8/2011 | Reitz et al. |

* cited by examiner

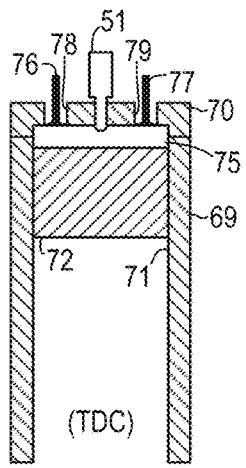 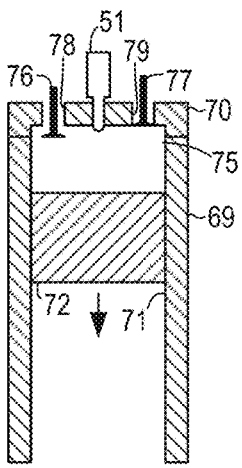 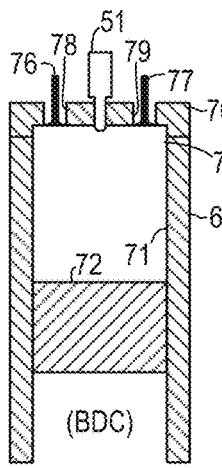 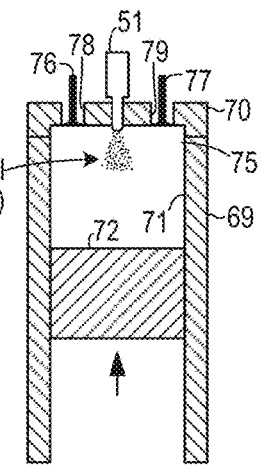
FIG. 3A	FIG. 3B	FIG. 3C	FIG. 3D
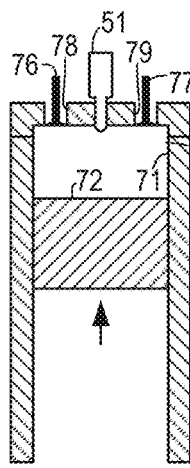 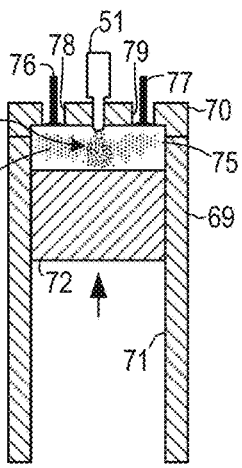 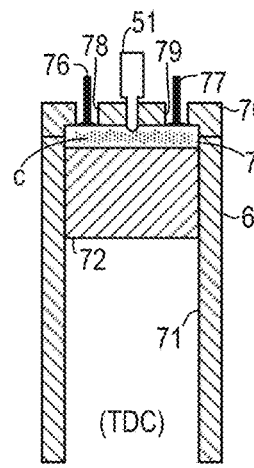 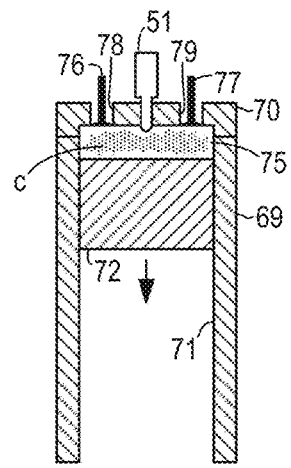
FIG. 3E	FIG. 3F	FIG. 3G	FIG. 3H

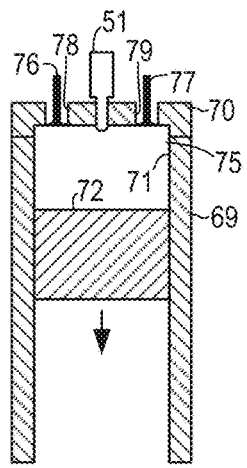 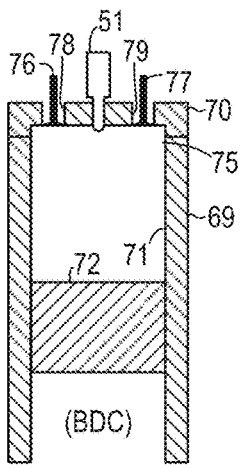 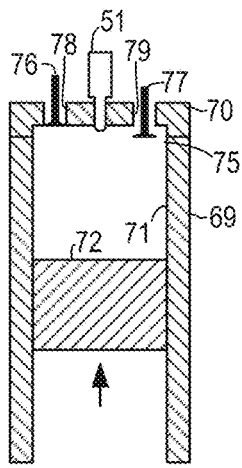 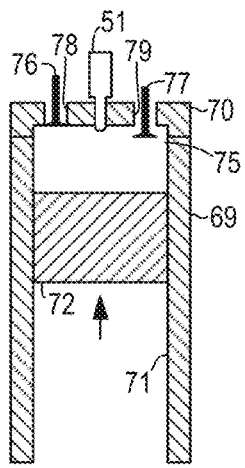
FIG. 3I  FIG. 3J  FIG. 3K  FIG. 3L
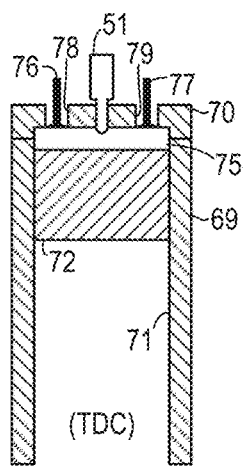 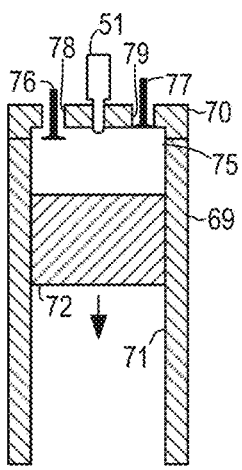
FIG. 3M  FIG. 3N

| | Speed (rpm) | Rail Pres. (bar) | M1 Fuel Qty (mm³) | Total Fuel Qty (mm³) | M1 Timing (°bTDC) | M2 Timing (°bTDC) | Main 1-2 Sep. (μs) | MCT (°C) | Power (hp) | Peak Pres. (kPaA) | MAP (kPaA) | EGT (°C) | Rmax (kPa/deg.) | W_bTDC (J/cyc) | MFB_bTDC (%) |
|---|---|---|---|---|---|---|---|---|---|---|---|---|---|---|---|
| Ref. | 3200 | 720 | 3.6 | 32.2 | 42.1 | 19.1 | 1200 | -20 | 60.9 | 100.5 | 116 | 565 | 2132 | -311.7 | -.1 |
| A | 3200 | 994 | 13.3 | 32 | 49.9 | 10.2 | 2070 | -20 | 48.7 | 84.5 | 103 | 499 | 1546 | -277.5 | 23.4 |
| B | 2900 | 982 | 13.3 | 32 | 46.3 | 10.4 | 2063 | -20 | 44.2 | 84.2 | 95 | 514 | 1609 | -256.8 | 27 |
| C | 2600 | 994 | 13.6 | 32 | 42.4 | 9.7 | 2094 | -20 | 36.1 | 78.4 | 83 | 533 | 1759 | -226.9 | 35.7 |

TORQUE-SLEWING DIESEL ENGINE OPERATION

CROSS-REFERENCE TO RELATED APPLICATIONS

This application is a continuation of and claims priority to U.S. patent application Ser. No. 16/411,799, filed May 14, 2019, and entitled "Torque-Slewing Diesel Engine Operation," which is hereby incorporated by reference in its entirety.

GOVERNMENT LICENSE RIGHTS

This invention was made with Government support under Contract Nos. W31P4Q-05-A-003/TO32 and W31P4Q-18-A-0052 awarded by the United States Army. The Government has certain rights in this invention.

BACKGROUND

Diesel engines offer numerous advantages relative to spark-ignition engines. Diesel engines rely on heat from compression of air in cylinders to ignite fuel. For this reason, diesel engines typically operate at higher compression ratios and are more fuel efficient than spark-ignition engines. Moreover, diesel fuel is similar to (or may even be the same as) kerosene or jet fuel. For these and other reasons, diesel engines have been, and are, used for aircraft propulsion.

Aircraft use of diesel engines presents challenges, however. Combustion quality in a diesel engine is related to engine load. At low power settings, combustion quality may degrade significantly and potentially cause engine damage. In order to maintain stable combustion, fuel must be supplied to the engine at or above a minimum rate. Operation of an aircraft diesel engine at low power settings may also present other challenges. For example, most if not all aircraft diesel engines include turbochargers that rely on a minimum level of exhaust gas flow to operate. If power is decreased too much, the turbocharger may cease to provide enough boost pressure to the intake air used for combustion and the engine may stall. Restarting a diesel engine is difficult at higher altitudes.

To avoid poor combustion quality and other problems associated with low power settings, aircraft diesel engines are typically operated so that fuel is supplied at a rate that provides at least a minimum amount of fuel required for stable combustion. However, a shaft output power resulting from that minimum fuel rate may provide more power than is needed during certain portions of a flight envelope. During descent from high altitude, for example, much less power is needed to turn a propeller. A higher-than-needed shaft output power may create undesirable flight restrictions by, e.g., requiring additional time to descend because shaft output power cannot be reduced below a certain level without risking engine stall.

SUMMARY

This Summary is provided to introduce a selection of some concepts in a simplified form as a prelude to the Detailed Description. This Summary is not intended to identify key or essential features.

A diesel engine may be operated at a minimal fuel rate. The minimal fuel rate may approximately correspond to a minimum fuel amount needed to maintain stable combustion. The shaft output power of the engine, while operating at the minimal fuel rate, may be reduced by initiating combustion during the compression stroke. Combustion during the compression stroke may be caused by advancing fuel injection timing and/or manipulating fuel quantity of a particular portion of the injection. The diesel engine may be an aircraft diesel engine.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

FIGS. 3A, 3B, 3C, 3D, 3E, 3F, 3G, 3H, 3I, 3J, 3K, 3L, 3M, and 3N are partially-schematic area cross-sectional views, of a cylinder of the engine of FIG. 2, during different parts of an engine cycle.

DETAILED DESCRIPTION

Shaft output power of an aircraft diesel engine, when operated at or near a minimal fuel rate, may be reduced by increasing negative work performed by the engine. The minimal fuel rate may approximately correspond to supplying, during each cycle and to each cylinder, a minimum amount of fuel required for stable combustion. Timing of fuel injection may be advanced so that at least a portion of a total mass of fuel, combusted during an engine cycle, is combusted during a compression stroke. The combustion during the compression stroke may increase the work needed to perform the compression stroke. In turn, this may slew generation of a portion of the engine torque from an expansion stroke to the compression stroke. Torque generated during an expansion stroke contributes to total shaft output power for the engine, but torque generated during a compression stroke reduces the total shaft output power. By slewing generation of the engine torque to the compression stroke, shaft output power of the engine may be reduced beyond what may otherwise be practical when operating at a minimal fuel rate.

Figure 1:
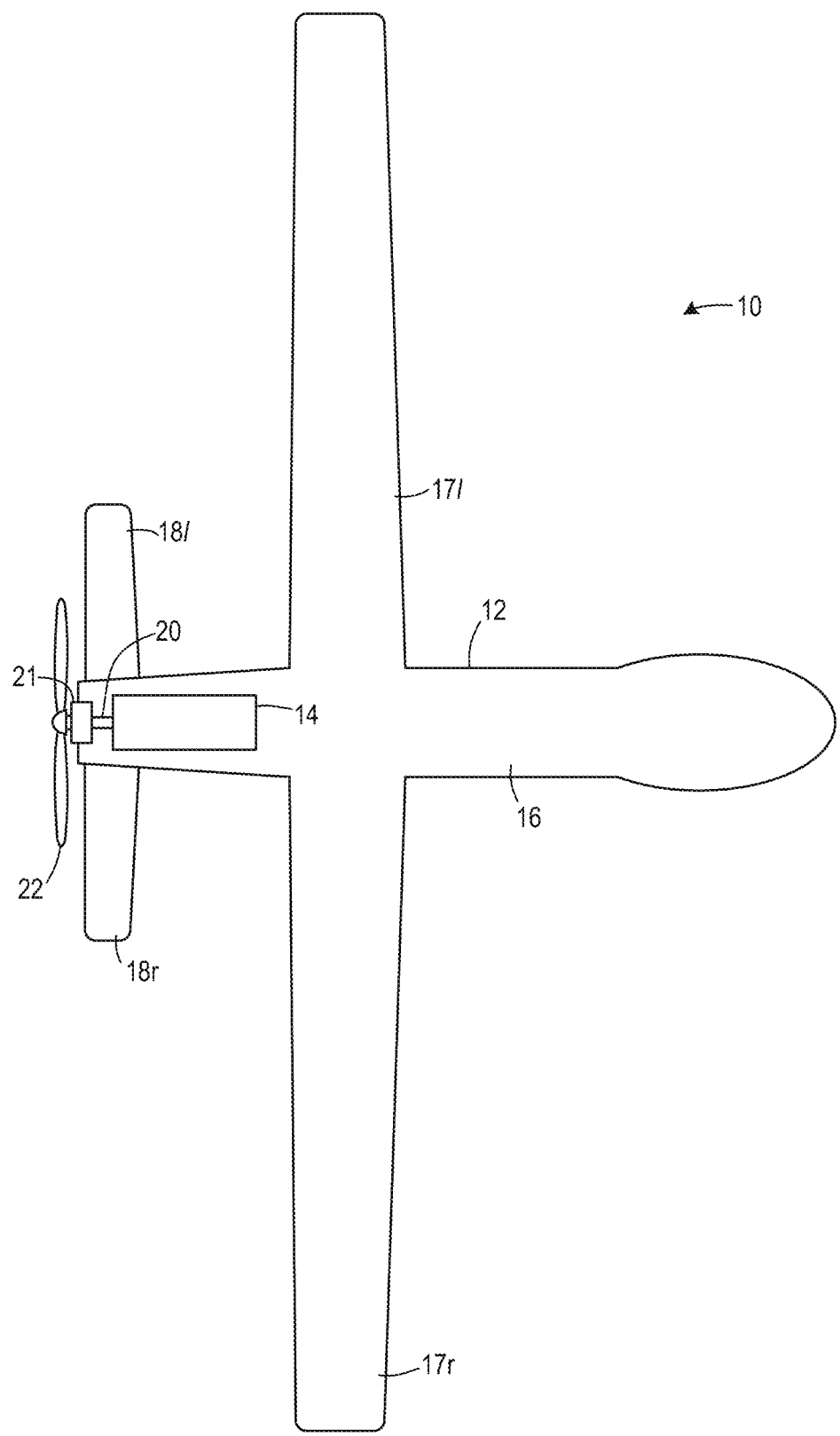
FIG. 1 is a partially-schematic top plan view of an example aircraft powered by a diesel engine.

FIG. 1 is a partially-schematic top plan view of an example aircraft 10 powered by a diesel engine 14. Aircraft 10 comprises an airframe 12, with the airframe 12 further comprising a fuselage 16, wings 17*l* and 17*r*, and stabilizers 18*l* and 18*r*. Each of stabilizers 18*l* and 18*r* may be a combination vertical/horizontal stabilizer, and/or the airframe 12 may comprise an additional vertical stabilizer (not shown). A shaft 20 of the engine 14 may be coupled to a transmission 21 so as to rotatably drive a propeller 22.

The aircraft 10 may be, e.g., an unmanned aerial vehicle (UAV) used for reconnaissance or other purposes. However, the aircraft 10 is merely an example of aircraft that may comprise diesel engines operated as described herein. Other examples of such aircraft include, without limitation, manned aircraft, aircraft with different engine mounting configurations (e.g., nose-mounted, wing-mounted), and/or multi-engine aircraft.

Figure 2:
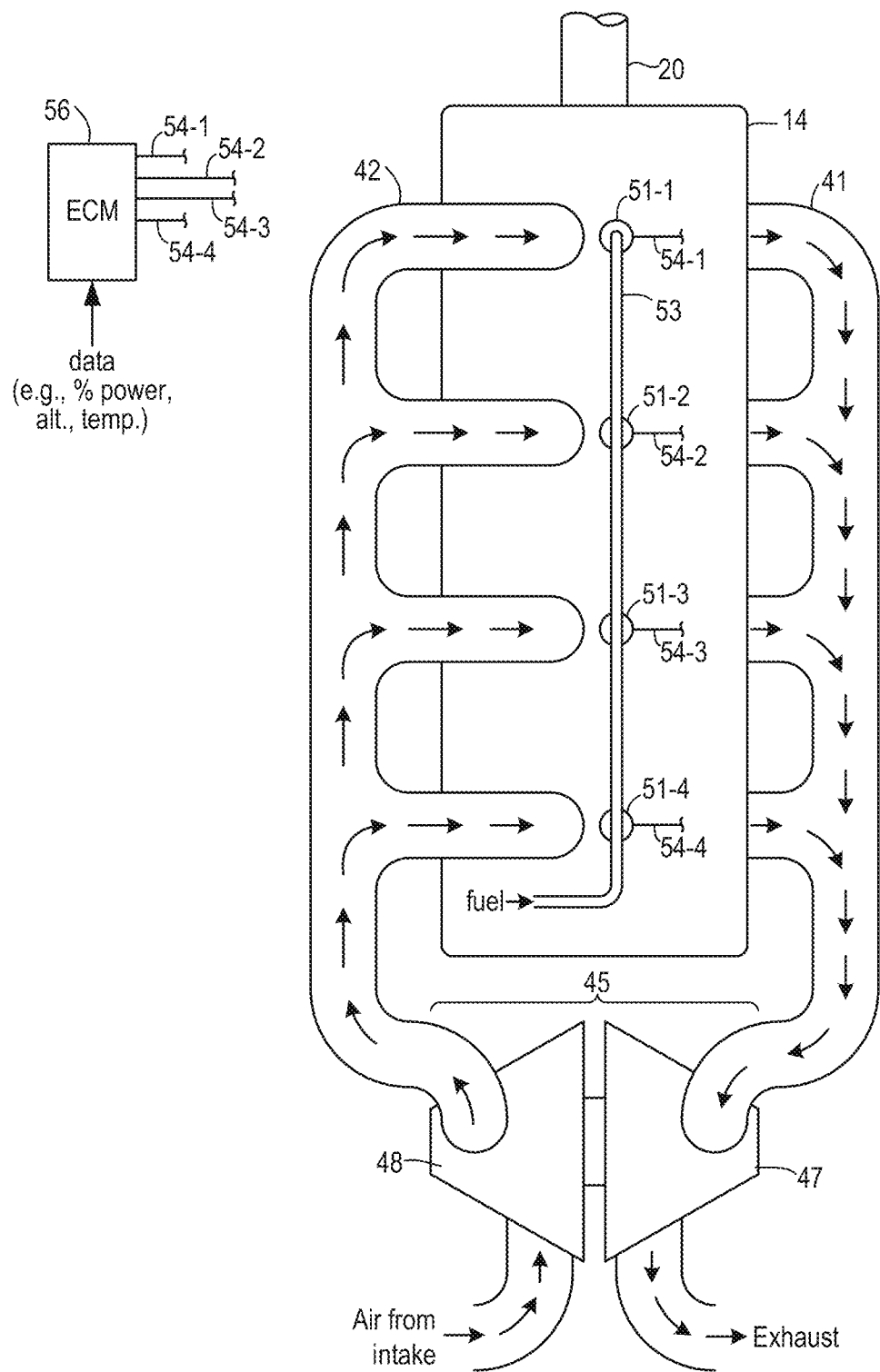
FIG. 2 is a partially-schematic diagram of the diesel engine from the aircraft of FIG. 1.

FIG. 2 is a partially-schematic diagram of engine 14 from FIG. 1. In the example of FIG. 2, engine 14 is a 4-cylinder inline diesel engine. Each of the cylinders of the engine 14 comprises an exhaust valve that, when open, allows exhaust gas to flow from the cylinder to an exhaust manifold 41. Each of those cylinders also comprises an intake valve that, when open, allows air to flow into the cylinder from an intake manifold 42.

The exhaust manifold 41 and the intake manifold 42 are both connected to a turbocharger 45. Exhaust gases flow through the exhaust manifold 41 and enter a high pressure side of a turbine 47 of the turbocharger 45, expand within the turbine 47, and exit through a low pressure side of the turbine 47 to an exhaust system. Air from an intake system enters a low pressure side of the compressor 48, is compressed in the compressor 48, and exits a high pressure side of the compressor 48 into the intake manifold 42. The expanding exhaust gases in the turbine 47 rotatably drive the turbine 47, which in turn rotatably drives the compressor 48.

The engine 14 may further comprise injectors 51-1 through 51-4. Each of injectors 51-1 through 51-4 may correspond to a different one of the four cylinders of the engine 14 and may be selectively activated to allow flow of fuel into the cylinder from a pressurized fuel line 53. The injectors 51-1 through 51-4 may be respectively connected to control lines 54-1 through 54-4. An engine control module (ECM) 56 may selectively output control signals, via the control lines 54-1 through 54-4, to cause the injectors 51-1 through 51-4 to open at the desired portion of the cycle of each corresponding cylinder. The ECM 56 may comprise one or more processors and memory storing instructions that, when executed by the one or more processors, cause the ECM to perform such operations. The ECM may receive input data (e.g., desired output power of the shaft 20, altitude of the aircraft 10, ambient air temperature outside the aircraft 10, rotational position of crankshaft of the engine 14), and using a look-up table and/or other algorithm, selectively output signals, via the lines 54-1 through 54-4, to control the time(s) during the cycles of the corresponding cylinders when the injectors 51-1 through 51-4 may be opened. The ECM 56 may control the amount of fuel injected into a cylinder by controlling a duration of the time that an injector remains open.

In addition to the transmission 21 and propeller 22, one or more additional components, not shown, may also be coupled to and powered by the output shaft 20. Such components may include, without limitation, one or more alternators, one or more pumps (e.g., a hydraulic fluid pump, a fuel pump), and/or one or more other components.

Other example diesel engines may also be operated according to one of more characteristics and/or features described herein, but may differ from the engine 14 in one or more ways. Such other diesel engines may have more than four cylinders or fewer than four cylinders. Such other diesel engines may have cylinders in a V arrangement, in a horizontally-opposed arrangement, in a radial arrangement, or in some other arrangement. Such other diesel engines may have one or more additional turbochargers, may have a different turbocharger configuration, and/or may include one or more intercoolers interposed between a turbocharger and intake ports of cylinders. Such other diesel engines may comprise a fuel supply system different from the common rail configuration shown for the engine 14, e.g., a fuel supply system in which one or more cylinders are served by a fuel line that is separate from a fuel line serving one or more other cylinders.

The engine 14 may be a four-stroke diesel engine. In operation, each cylinder has a cycle that occurs during two revolutions of a crankshaft and that comprises an intake stroke, a compression stroke following the intake stroke, an expansion stroke following the compression stroke, and an exhaust stroke following the expansion stroke. Following the expansion stroke of a cycle, the next cycle begins with an intake stroke.

FIGS. 3A through 3N are partially-schematic area cross-sectional views of a cylinder 71 of the engine 14. FIGS. 3A through 3N are based on a sectioning plane that is parallel to the stroke of a piston 72 in the cylinder 71, and that passes through the center of the cylinder 71. For convenience, only the portions of a block 69 and a cylinder head 70 of the engine 14 that define the cylinder 71 are shown. A portion of the cylinder 71 above the top of the piston 72 forms a combustion chamber 75. An intake valve 76 is positioned in, is openable to permit flow through, and is closable to prevent flow through, an intake port 78. An exhaust valve 77 is positioned in, is openable to permit flow through, and is closable to prevent flow through, an exhaust port 79. A connecting rod connecting the piston 72 to the crankshaft of the engine 14 is omitted from FIGS. 3A through 3N, but is understood to be present.

FIGS. 3A through 3M show operation of the cylinder 71 during a single cycle, with FIG. 3N showing the beginning of a following cycle. The other cylinders of the engine 14 may be similar to, and may operate in a manner similar to that described for, the cylinder 71. At any given time during operation of the engine 14, however, and for each of the cylinders, the portion of a cycle being performed may be different from portions of cycles being performed in connection with the other cylinders. When performing the operations of FIGS. 3A through 3N, the aircraft 10 may be idling at an altitude A. Example values for A may comprise 15,000 feet above sea level (ASL), 20,000 feet ASL, 25,000 feet ASL, or other values.

FIG. 3A shows the cylinder 71 at the beginning of an intake stroke of a cycle for the cylinder 71. An exhaust stroke of a previous cycle for the cylinder 71 has just been completed. The cylinder 72 is at a top dead center (TDC) position. The exhaust valve 77 has just closed, and the intake valve 76 is about to open. An injector 51, which may be one of the injectors 51-1 through 51-4 that corresponds to the cylinder 71, is also closed. In FIG. 3B, the intake stroke of the cycle for the cylinder 71 has begun. The intake valve 76 has opened, and as the piston 72 moves downward, air from the intake manifold 42 flows through the intake port 78 into the combustion chamber 75. The injector 51 and the exhaust valve 77 are closed. FIG. 3C shows the cylinder 71 as the intake stroke is completed and the compression stroke begins. The piston 72 is at a bottom dead center (BDC) position. The intake valve 76 has just closed. The injector 51 and the exhaust valve 77 are closed.

FIG. 3D shows the cylinder 71 during the compression stroke and as the piston 72 is moving upward. The injector 51 has, based on a signal from the ECM 56, opened to allow an injection M1, of a first portion of an amount of fuel MFI_cyc, into the cylinder 71. For convenience, "MFI_cyc" is used as an abbreviation for "mass of fuel injected per cycle" and represents a total amount of fuel that is injected into the cylinder 71 during a cycle. In the example of FIGS. 3A through 3N, "MFI_cyc" for idling operation may be represented as $X*f_{MIN}$. The value $f_{MIN}$ may represent a minimum amount of fuel that will maintain stable combustion in the cylinder 71 during a single cycle at a minimum load on the engine 14, and may vary based on altitude, temperature, and/or other conditions. For a given engine and load, $f_{MIN}$ may be determined, using known techniques, as a minimum amount of fuel yielding stable combustion within an established maximum pressure rise rate criteria. The value X may represent a safety factor. Example values of X may comprise 1.05, 1.10, 1.15, etc. The example of FIGS. 3A through 3N shows that MFI_cyc may be injected in two separate portions. A first portion of MFI_cyc is injected in a first injection M1 and a second portion of MFI_cyc is injected in a second injection M2, described below. MFI_cyc may alternatively be injected in a single injection or divided among more than two injections, and/or injections may occur at different times during a compression stroke. In FIG. 3D, the intake valve 76 and the exhaust valve 77 are closed.

FIG. 3E shows the cylinder 71 at a later time during the compression stroke, and as the piston 72 continues to move upward and compress the air and fuel in the combustion chamber 75. The intake valve 76, the exhaust valve 77, and the injector 51 are closed. FIG. 3F shows the cylinder 71 at a later time during the compression stroke. The injection M2, of the second portion of MFI_cyc into the cylinder 71, has begin. Combustion c of the fuel in the cylinder 71 has begun while the piston 72 continues to move upward. Although the combustion c and the injection M2 may begin at the same time, they need not (e.g., the combustion c may begin after or before the injection M2 has begun). The combustion c increases the pressure in the combustion chamber 75 above what the pressure would be in the absence of combustion, thereby increasing the work needed to move the piston 72 upward. In particular, and even in the absence of combustion, the upward movement of the piston 72 decreases the volume in the combustion chamber 75. This volume decrease results in a pressure increase such that more work is needed as the piston 72 nears TDC. Work during the compression stroke does not contribute to power output of the shaft 20, and as such may be treated as "negative" work. The occurrence of the combustion c during the compression stroke increases the pressure beyond the pressure attributable to volume decrease. Because of the additional pressure contribution of the combustion c during the compression stroke, the amount of negative work during a cycle is increased.

The injection of the MFI into the cylinder 71 may be timed so that a first portion U of a total mass of fuel burned (MFB) in the cylinder 71 during the cycle is combusted before TDC during the compression stroke, and a second portion V of the total MFB in the cylinder 71 during the cycle is combusted after TDC during the expansion stroke, and so that U+V=100%. Example values for U comprise 10%, 15%, and 20%, as well as values discussed below in connection with FIGS. 4 through 6. In the example of FIGS. 3A-3N, all injection of fuel during a cycle may be completed during the compression stroke. For a given cycle of the cylinder 71, the total MFB may be less than the MFI_cyc for the cylinder 71 during the cycle (e.g., combustion may be incomplete).

FIG. 3G shows the cylinder 71 as the compression stroke is completed, and as the expansion stroke is about to begin. The combustion c of the previously-injected fuel continues. The intake valve 76, the exhaust valve 77, and the injector 51 are closed. FIG. 3H shows the cylinder 71 during an early portion of the expansion stroke. The combustion c of the previously-injected fuel continues. The intake valve 76, the exhaust valve 77, and the injector 51 remain closed. FIG. 3I shows the cylinder 71 as the expansion stroke continues. The combustion c of the previously-injected fuel has ended. The intake valve 76, the exhaust valve 77, and the injector 51 remain closed.

FIG. 3J shows the cylinder 71 as the expansion stroke has completed and as the exhaust stroke is about to begin. The piston 72 has reached the BDC position. The intake valve 76, the exhaust valve 77, and the injector 51 remain closed. FIG. 3K shows the cylinder 71 during the exhaust stroke. The exhaust valve 77 has opened to allow exhaust gases to flow from the combustion chamber 75, through the exhaust port 79, to the exhaust manifold 41. The piston 72 is moving upward. The intake valve 76 and the injector 51 remain closed. FIG. 3L shows the cylinder 71 at a later part of the exhaust stroke. The piston 72 has moved further upward, the exhaust valve 77 remains open, and the intake valve 76 and the injector 51 remain closed. FIG. 3M shows the cylinder 71 as the exhaust stroke has been completed and the as the intake stroke of the next cycle is about to begin. The piston 72 is at the TDC position. The intake valve 76, the exhaust valve 77, and the injector 51 are closed. FIG. 3N shows the cylinder 71 after the intake stroke of the next cycle has begun.

Figures 4, 6:
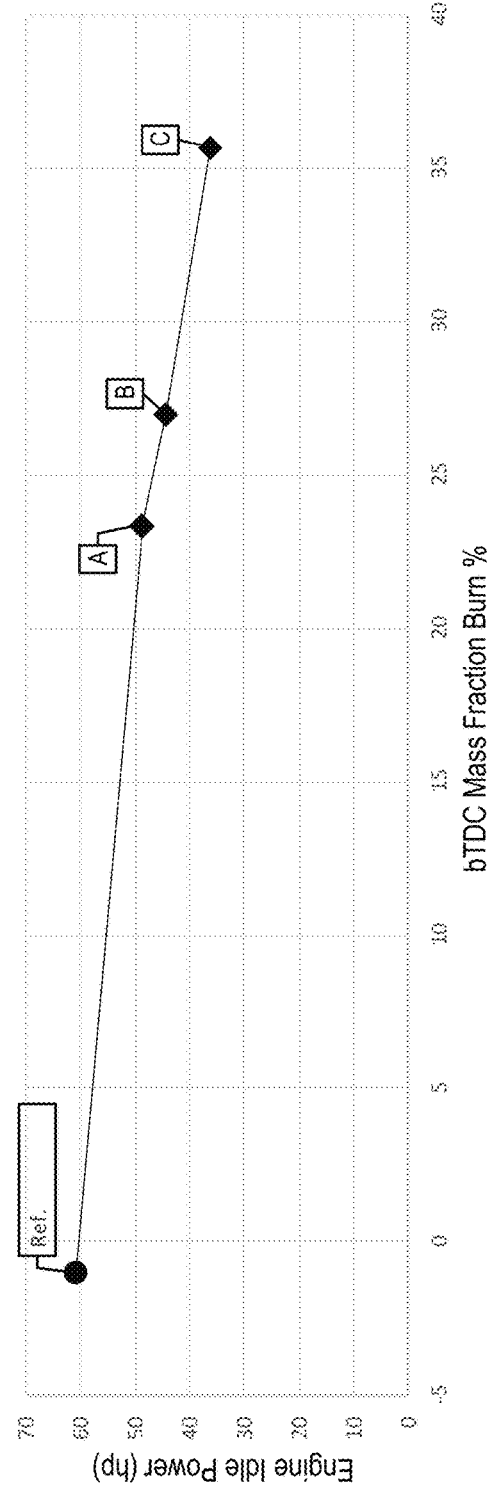
FIG. 4 is a chart comparing data for an idling diesel engine during four test runs.
FIG. 6 is a graph of horsepower versus mass fraction burn percentage for the test runs of FIG. 4.

FIG. 4 is a chart comparing data for an idling diesel test engine during four test runs "Ref.," "A," "B," and "C." Test run Ref. represents idling operation of the test engine using known injection timing and known apportionment of total fuel quantity among injections. Each of test runs A, B, and C represents idling operation of the test engine using injection timing and fuel apportionment that results in combustion before TDC.

Each of the test runs Ref., A, B, and C was performed in the same test engine and at conditions simulating an altitude of 25,000 feet ASL. The test engine was a turbo-charged four-cylinder engine having a displacement of 1991 cubic centimeters, with each cylinder having a bore of 83 mm and a stroke of 92 mm, and a compression ratio of 18:1. Each of the rows in FIG. 4 applies to the test run indicated at the left side of FIG. 4. The data in each row represents measured and/or calculated values that were averaged over 116 cycles of the test run indicated for the row. The test runs shown in FIG. 4 were selected based on each of the runs having the same amount of fuel injected per cycle. Data for other runs involving different total fuel quantities per cycle have been omitted.

Each of the cells in the first column of FIG. 4 ("Speed (rpm)") indicates the speed, in RPM, of the test engine during the corresponding test run. Each of the cells in the second column ("Rail Pres. (bar)") indicates the rail pressure, in bar, of the test engine fuel injection system during the corresponding test run. Each of the cells in the third column ("M1 Fuel Qty (mm$^3$)") indicates, for a single cylinder of the test engine, a fuel quantity (in cubic millimeters) of a first injection M1 for each cycle during the corresponding test run. Each of the cells in the fourth column ("Total Fuel Qty (mm$^3$)") indicates, for a single cylinder of the test engine, a total fuel quantity (in cubic millimeters) injected for each cycle during the corresponding test run. Although not shown in FIG. 4, the fuel quantity for a second injection M2, for each cycle of the cylinder during one of the test runs, can be determined by subtracting the value in the third column ("M1 Fuel Qty (mm$^3$)") for that test run from the value in the fourth column ("Total Fuel Qty (mm$^3$)") for that test run.

As can be seen by comparing values in the third and fourth columns for the various test runs, more fuel was initially injected for the test runs A, B, and C than for the test run Ref. For the test run Ref., 3.6 mm$^3$ (approximately 11%) of the 32.2 mm$^3$ total fuel quantity was injected in first injection M1. For the test runs A, B, and C, the percentage of total fuel quantity injected during the first injection M1 is significantly higher: approximately 42% (13.3 mm$^3$/32 mm$^3$) for the test runs A and B and approximately 43% (13.3 mm$^3$/32 mm$^3$) for the test run C.

Each of the cells in the fifth column ("M1 Timing (° bTDC)") indicates, for a single cylinder of the test engine, the timing (in degrees before TDC) of the start of the first injection M1 for each cycle during the corresponding test run. Each of the cells in the sixth column ("M2 Timing (° bTDC)") indicates, for a single cylinder of the test engine, the timing (in degrees before TDC) of the start of the second injection M2 for each cycle during the corresponding test run. Each of the cells in the seventh column ("Main 1-2 Sep. (μs)") indicates, for a single cylinder of the test engine, and for each cycle during the corresponding test run, the time difference (in microseconds) between the start of the first injection M1 and the start of the second injection M2. As can be seen by comparing values in the fifth, sixth, and seventh columns for the various test runs, injection timing for the test run Ref. differed significantly from that for the test runs A, B, and C.

Each of the cells in the eighth column of FIG. 4 ("MCT (° C.)") indicates the manifold charge temperature, in degrees Celsius, of the test engine during the corresponding test run. This temperature is the temperature of the air in the intake manifold (e.g., such as the intake manifold 42) that flows into the cylinders. Each of the cells in the ninth column ("Power (hp)") indicates the power, in horsepower, output by the test engine shaft during the corresponding test run. For the test runs A, B, and C, the engine shaft horsepower at idle was significantly reduced relative the engine shaft horsepower at idle for the test run Ref. For the test run A, for example, the shaft horsepower at idle represents a 20% reduction relative to the shaft horsepower at idle for the test run Ref. The reductions for the test runs B and C are even greater (approximately 27% and approximately 41%, respectively). This reduction of horsepower at idle, while still maintaining stable combustion, is a significant advantage for aircraft diesel engines.

Each of the cells in the tenth column ("Peak Pres. (kPaA)") indicates, for a single cylinder of the test engine, peak pressure (in kiloPascals absolute) for each cycle during the corresponding test run. The higher value for the test run Ref. (100.5 kPaA) relative to values for the test runs A (84.5 kPaA), B (84.2 kPaA), and C (78.4) kPaA is the result of a greater amount of fuel being burned in a shorter time period in the test run Ref. In the test run Ref., the in-cylinder temperatures and pressures are higher when combustion begins, which yields a higher rate of combustion. In the test runs A, B, and C, combustion begins earlier and extends over a longer time period. Each of the cells in the eleventh column ("MAP (kPaA)") indicates the manifold air pressure (the air pressure in the intake manifold, in kiloPascals absolute), of the test engine during the corresponding test run. The higher value for the test run Ref. (116 kPaA) relative to values for the test runs A (103 kPaA), B (95 kPaA), and C (83) kPaA is also the result of a greater amount of fuel being burned in a shorter time period in the test run Ref. The higher peak pressure and higher temperature in the cylinder for the test run Ref. result in exhaust gas entering the turbocharger turbine with more energy than in the test runs A, B, and C. This results in greater compression, on the compressor side of the turbocharger, than in the test runs A, B, and C.

Each of the cells in the twelfth column of FIG. 4 ("EGT (° C.)") indicates the turbocharger turbine inlet temperature, in degrees Celsius, of the test engine during the corresponding test run. The higher value for the test run Ref., as indicated above, is attributable to higher rate of combustion in the test run Ref. relative to the test runs A, B, and C. Each of the cells in the thirteenth column ("Rmax (kPa/deg.)") indicates, for a single cylinder of the test engine, the rate of pressure rise (in kiloPascals per degree of crank angle), for each cycle during the corresponding test run. For each of test runs A, B, and C, the values for rate of pressure rise are significantly less than for test run Ref. Values for rate of pressure rise greater than approximately 2000 kPa/deg. may result in excessive engine knock and be disadvantageous.

Each of the cells in the fourteenth column of FIG. 4 ("W bTDC (J/cyc)") indicates the work, in Joules per cycle, performed by the test engine during the compression stroke of the corresponding run. These values are shown as negative, as they represent work that must be performed by the engine to push the cylinders during compression strokes, and are not work that is output from the engine. The W bTDC value shown for the test run Ref. (−311.7 J/cyc) is larger than the W bTDC values shown for the test runs A (−277.5 J/cyc), B (−256.8 J/cyc), and C (−226.9 J/cyc). However, the negative work performed during the compression stroke, as a percentage of positive work performed after TDC during the expansion stroke, is less for the test run Ref. than for the test runs A, B, and C. As a result, the overall test engine output power, discussed above for the ninth column, is less for the test runs A, B, and C.

Each of the cells in the fifteenth column of FIG. 4 (MFB_bTDC (%)) indicates, for a single cylinder of the test engine, a percentage of the total mass of fuel burned (MFB) in the cylinder during the cycle that is combusted before TDC, and thus, during the compression stroke. The values in the fifteenth column were obtained by using pressure curves to obtain heat release curves, and using the heat release curves to calculate MFB_bTDC. The value of −0.1% for the test run Ref. is an artifact of the calculation process and indicative of no combustion occurring before TDC. The significant percentages of MFB_bTDC for the test runs A (23.4%), B (27%), and C (35.7%) correlate with the reductions in power output discussed above in connection with the ninth column of FIG. 4.

Figure 5A:
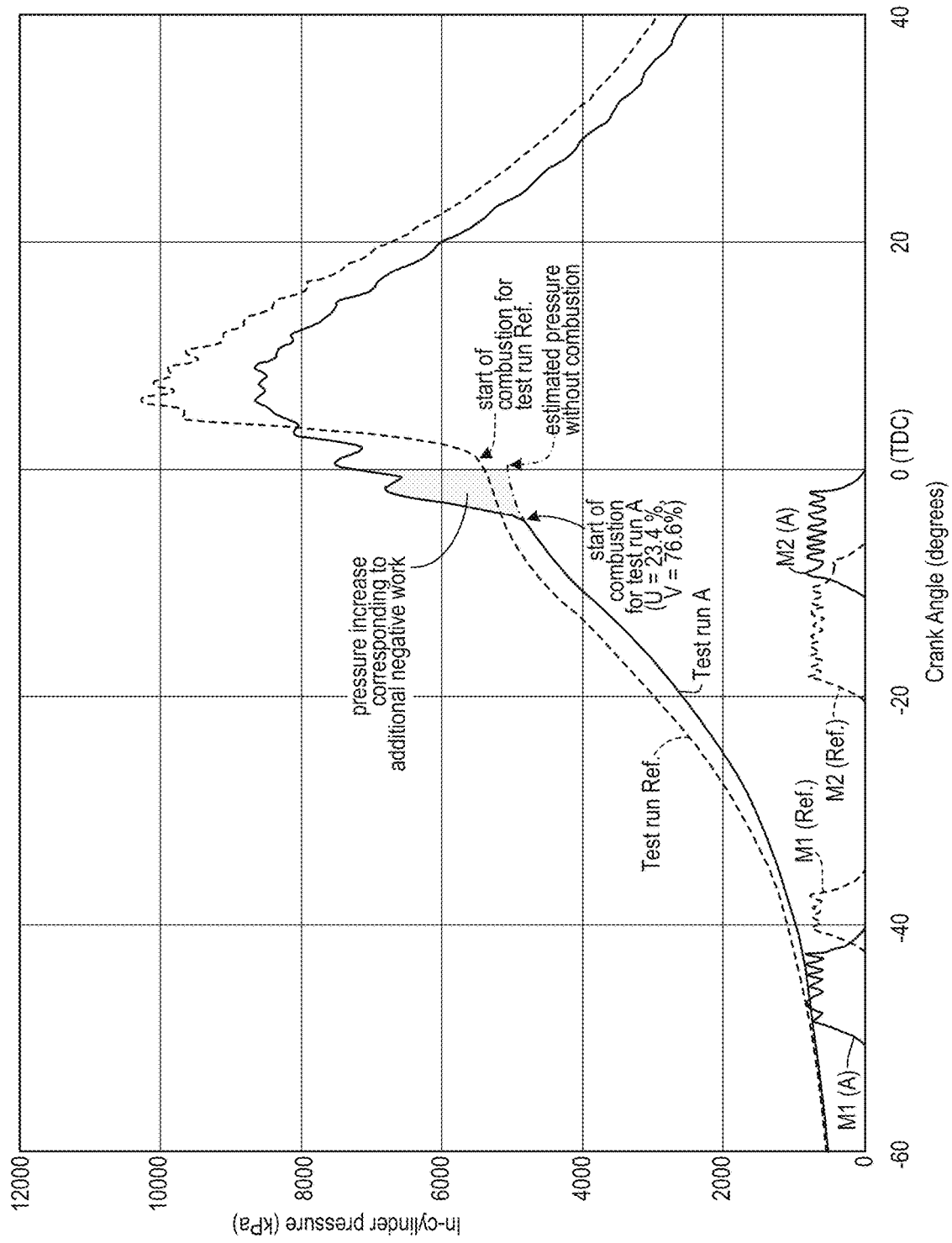
FIGS. 5A, 5B, and 5C are graphs showing curves for in-cylinder pressure versus crank angle curves, and for injection timing, for different pairs of the test runs of FIG. 4.
Figure 5B:
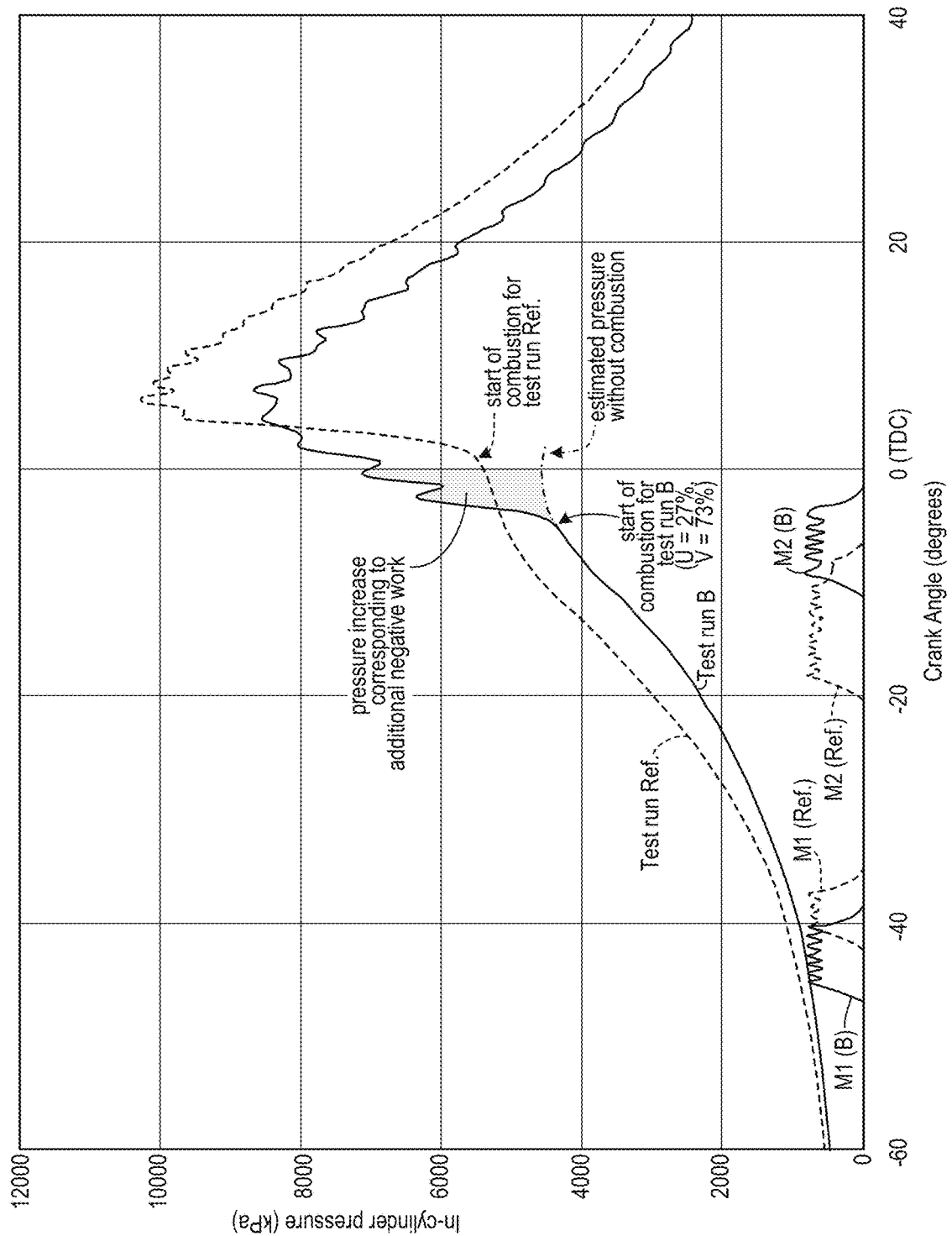
Figure 5C:
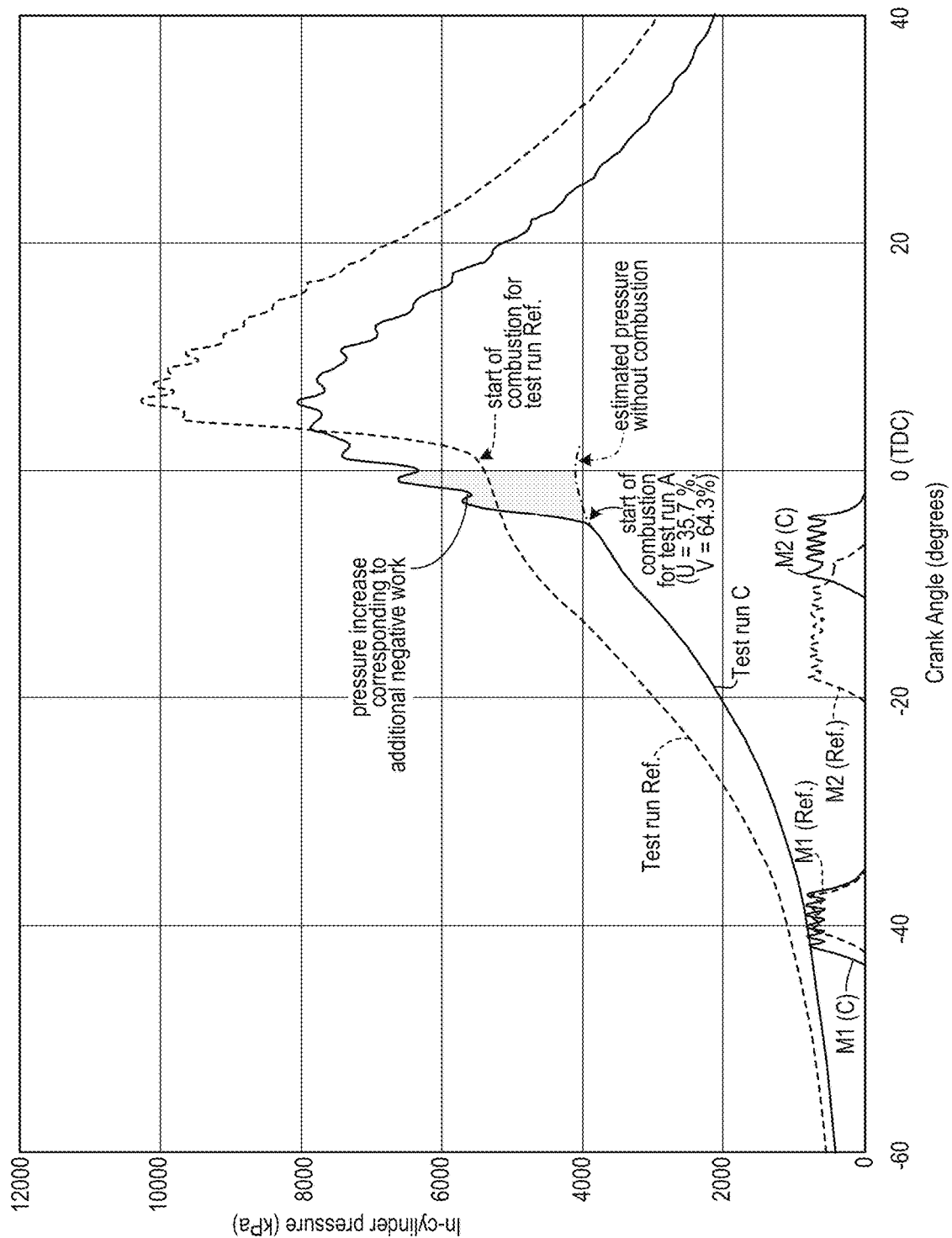

FIGS. 5A, 5B, and 5C are a graphs showing in-cylinder pressure versus crank angle curves, during a later portion of a compression stroke and a beginning portion of a following expansion stroke, for different pairs of the test runs of FIG. 4. In each of FIGS. 5A, 5B, and 5C, in-cylinder pressure (in the combustion chamber) is shown on the vertical axis in units of kilopascals (kPa). Crankshaft angle, in degrees, is shown on the horizontal axis. A crankshaft angle of 0 degrees represents the piston being at the TDC position in the cylinder. The before-TDC (bTDC) portion of the graph to the left of 0 degrees represents a portion of the compression stroke and movement of the piston upward toward the TDC position. The after-TDC (aTDC) portion of the graph to the right of 0 degrees represents a portion of the expansion stroke and movement of the piston downward toward the BDC position.

FIG. 5A compares the test run Ref. and the test run A. FIG. 5A includes a curve labelled "Test run Ref.," shown with an even-length broken line, that plots in-cylinder pressure versus crank angle for the test run Ref. A sharp increase in rate of pressure rise for the test run Ref. curve corresponds to the start of combustion for the test run Ref. cycle. For the test run Ref., all of the combustion and the accompanying pressure increase occurs during the expansion stroke, thereby providing positive work and contributing to shaft output power.

FIG. 5A further includes a curve labelled "Test run A," shown with a solid line, that plots in-cylinder pressure versus crank angle for the test run A. A sharp increase in rate of pressure rise for the test run A curve corresponds to the start of combustion for the test run A cycle. Because combustion for the test run A begins during the compression stroke, additional negative work is performed to complete the compression stroke, as indicated by the shaded region. The uneven-length broken line extension of the test run A curve represents an estimate of the pressure rise in the combustion chamber attributable to volume reduction, but without increased pressure from combustion. The shaded region, to the left of the 0 degrees line and between the uneven-length broken line and the solid line, represents additional cylinder pressure that increases negative work, and that decreases shaft output power.

The bottom of FIG. 5A shows curves representing fuel injection timing for the test runs Ref. and A. The injection timing curves labelled "M1 (Ref.)," "M2 (Ref.)," "M1 (A)," and "M2 (A)" indicate rise in current to a solenoid controlling an injector. For each of these injection timing curves, the left intersection of the curve with the horizontal axis indicates when the injector opens, and the right intersection of the curve with the horizontal axis indicates when the injector closes. For example, and as shown by the M1 (Ref.) injection curve, the M1 injection for the test run Ref. begins at a crank angle of −42.1° (bTDC) and ends at a crank angle of approximately −35° (bTDC). The beginning crank angle for the M1 (Ref.) injection curve corresponds to the value in the "M1 Timing" column of FIG. 4 for the test run Ref. The M2 (Ref.) injection curve shows the beginning and end of the M2 injection for the test run Ref., with the beginning crank angle for the M2 (Ref.) curve corresponding to the value in the "M2 Timing" column of FIG. 4 for the test run Ref. The M1 (A) injection curve shows the beginning and end of the M1 injection for the test run A, with the beginning crank angle for the M1 (A) curve corresponding to the value in the "M1 Timing" column of FIG. 4 for the test run A. The M2 (A) injection curve shows the beginning and end of the M2 injection for the test run A, with the beginning crank angle for the M2 (A) curve corresponding to the value in the "M2 Timing" column of FIG. 4 for the test run A.

Also shown in FIG. 5A for the test run A are values for U, a percentage of MFB per cycle burned before TDC and during the compression stroke, and V, a percentage of MFB per cycle burned after TDC and during the expansion stroke. The value of U=23.4% shown in FIG. 5A corresponds to the value indicated in the "MFB_bTDC" column of FIG. 4 for the test run A. The value of V=76.6% shown in FIG. 5A is calculated from U+V=100%.

FIG. 5B compares the test run Ref. and the test run B. The broken line curve for in-cylinder pressure versus crank angle for the test run Ref., as well as the broken line injection timing curves labelled "M1 (Ref.)" and "M2 (Ref.)," are the same as in FIG. 5A. FIG. 5B further includes a curve labelled "Test run B," shown with a solid line, that plots in-cylinder pressure versus crank angle for the test run B. A sharp increase in rate of pressure rise for the test run B curve corresponds to the start of combustion for the test run B cycle. Because combustion for the test run B begins during the compression stroke, additional negative work is performed to complete the compression stroke, as indicated by the shaded region. The uneven-length broken line extension of the test run B curve represents an estimate of the pressure rise in the combustion chamber attributable to volume reduction, but without increased pressure from combustion. The shaded region, to the left of the 0 degrees line and between the uneven-length broken line and the solid line, represents additional cylinder pressure that increases negative work, and that decreases shaft output power. The M1 (B) injection curve shows the beginning and end of the M1 injection for the test run B, with the beginning crank angle for the M1 (B) curve corresponding to the value in the "M1 Timing" column of FIG. 4 for the test run B. The M2 (B) injection curve shows the beginning and end of the M2 injection for the test run B, with the beginning crank angle for the M2 (B) curve corresponding to the value in the "M2 Timing" column of FIG. 4 for the test run B.

Also shown in FIG. 5B for the test run B are values for U, a percentage of MFB per cycle burned before TDC and during the compression stroke, and V, a percentage of MFB per cycle burned after TDC and during the expansion stroke. The value of U=27% shown in FIG. 5B corresponds to the value indicated in the "MFB_bTDC" column of FIG. 4 for the test run B. The value of V=73% shown in FIG. 5B is calculated from U+V=100%.

FIG. 5C compares the test run Ref. and the test run C. The broken line curve for in-cylinder pressure versus crank angle for the test run Ref., as well as the broken line injection timing curves labelled "M1 (Ref.)" and "M2 (Ref.)," are the same as in FIG. 5A. FIG. 5C further includes a curve labelled "Test run C," shown with a solid line, that plots in-cylinder pressure versus crank angle for the test run C. A sharp increase in rate of pressure rise for the test run C curve corresponds to the start of combustion for the test run C cycle. Because combustion for the test run C begins during the compression stroke, additional negative work is performed to complete the compression stroke, as indicated by the shaded region. The uneven-length broken line extension of the test run C curve represents an estimate of the pressure rise in the combustion chamber attributable to volume reduction, but without increased pressure from combustion. The shaded region, to the left of the 0 degrees line and between the uneven-length broken line and the solid line, represents additional cylinder pressure that increases negative work, and that decreases shaft output power. The M1 (C) injection curve shows the beginning and end of the M1 injection for the test run C, with the beginning crank angle for the M1 (C) curve corresponding to the value in the "M1 Timing" column of FIG. 4 for the test run C. The M2 (C) injection curve shows the beginning and end of the M2 injection for the test run C, with the beginning crank angle for the M2 (C) curve corresponding to the value in the "M2 Timing" column of FIG. 4 for the test run C.

Also shown in FIG. 5C for the test run C are values for U, a percentage of MFB per cycle burned before TDC and during the compression stroke, and V, a percentage of MFB per cycle burned after TDC and during the expansion stroke. The value of U=23.4% shown in FIG. 5C corresponds to the value indicated in the "MFB_bTDC" column of FIG. 4 for the test run C. The value of V=76.6% shown in FIG. 5C is calculated from U+V=100%.

Figure 5D:
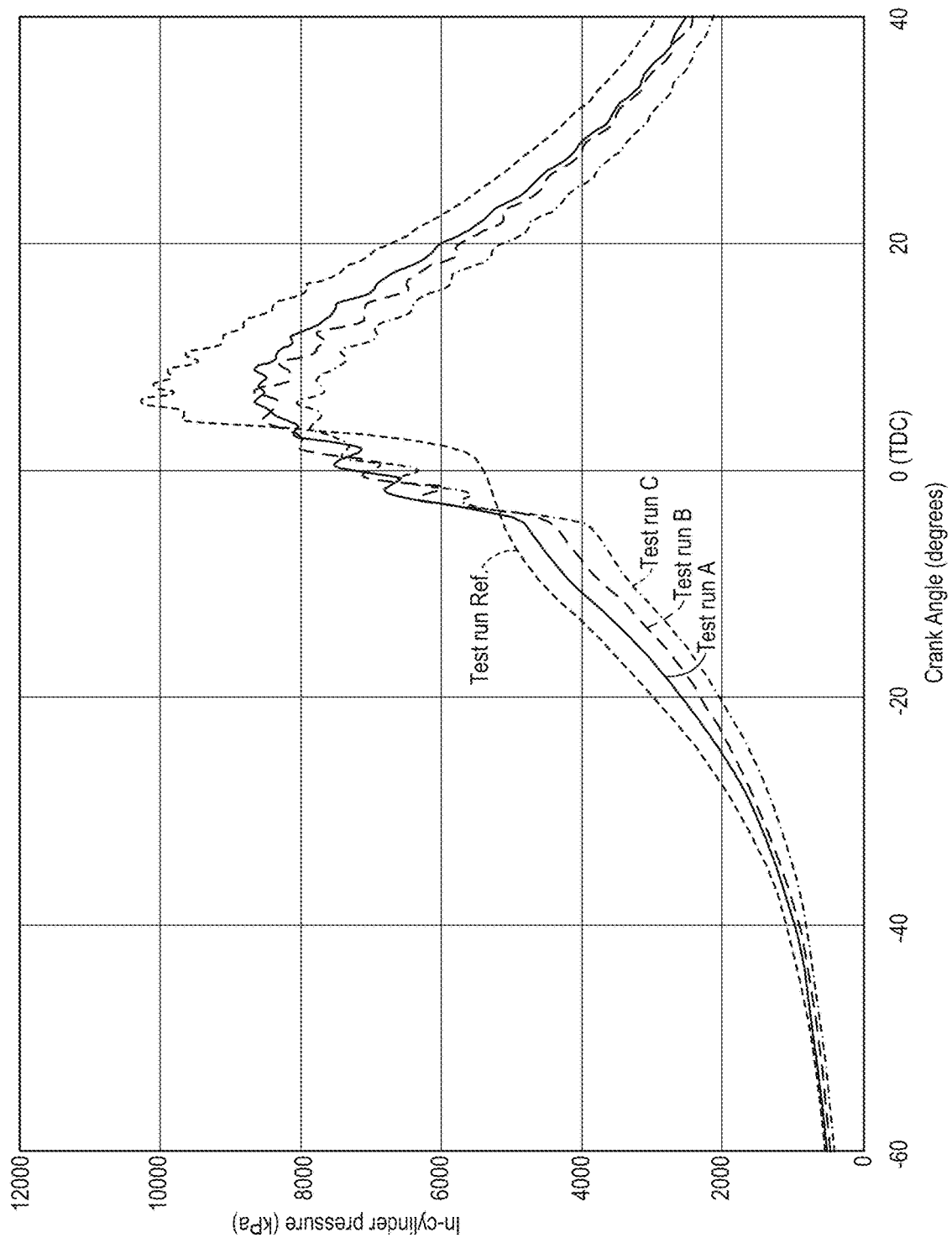
FIG. 5D is a graph combining the in-cylinder pressure versus crank angle curves from FIGS. 5A through 5C.

FIG. 5D consolidates, for comparison purposes, the in-cylinder pressure versus crank angle curves from FIGS. 5A through 5C. The curve labelled "Test run Ref." is the same as the curves with the same label in FIGS. 5A through 5C. The curve labelled "Test run A" is same as the curve with the same label in FIG. 5A. The curve labelled "Test run B" is same as the curve with the same label in FIG. 5B, but is shown with large even-length broken lines in FIG. 5D. The curve labelled "Test run C" is same as the curve with the same label in FIG. 5C, but is shown with uneven-length broken lines in FIG. 5D.

FIG. 6 is a graph of engine idle power (in horsepower) versus bTDC mass fraction burn percentage for the test runs of FIG. 4. As shown in FIG. 6, increasing the bTDC percentage of MFB reduces engine power output. Although the bTDC MFB percentages indicated in FIGS. 4 and 6 were based on fuel injection timing and quantities for a specific engine used for the test runs A, B, and C, the results are applicable to other diesel engines having different displacements, compression ratios, and/or no. of cylinders. Persons having ordinary skill in the art and knowledge of a particular engine could, based on the information provided herein, readily determine injection timing and quantities to obtain similar bTDC (compression stroke) MFB percentages and similar engine idle power reductions for that engine.

Figure 7:
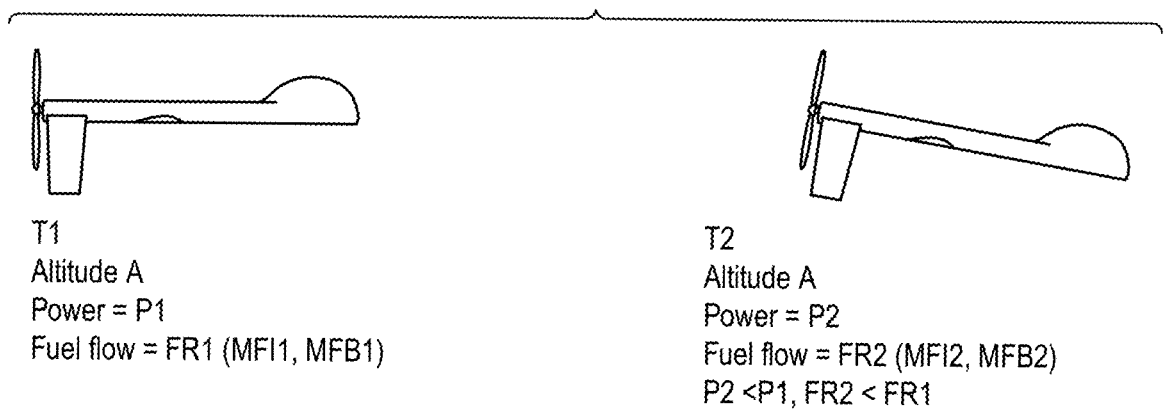
FIG. 7 is a diagram showing operation of the aircraft of FIG. 1 at different power levels.

FIG. 7 is a diagram showing operation of the aircraft 10 at different power levels. At a time T1, the aircraft 10 is flying at an altitude A. Example values for altitude A in FIG. 5 may be similar to those provided in connection with FIGS. 3A-3N. The engine 14 is generating shaft output power at a power level P1 sufficient to maintain the aircraft 10 at altitude and at cruising speed. The power level P1 is well above minimum power, and requires fuel flow at a rate FR1 that corresponds to a first MFI (MFI1) per cycle, per cylinder, well in excess of $f_{MIN}$. The fuel injection timing is set so that none of a first MFB (MFB1) per cycle, per cylinder, is combusted during the compression stroke.

At a time T2, the aircraft 10 is flying at altitude A, but has reduced shaft output power to idle power level P2 so that the aircraft 10 may descend to a lower altitude. Fuel flow has been reduced to a rate FR2 that corresponds to a second MFI (MFI2) per cycle, per cylinder, of $X*f_{MIN}$, with $1 \leq X \leq 1.10$. The fuel injection timing is set so that a portion U of a second MFB (MFB2) per cycle, per cylinder, is combusted during the compression stroke, and so that a portion V of MFB2, per cycle, per cylinder, is combusted during the expansion stroke, with U+V=100%. Example values for U comprise 10%, 15%, 20%, 25%, 30%, and 35%.

Existing engines configured to operate in a conventional manner at low power levels, e.g., as indicated for the test run Ref. in connection with FIGS. 4 through 6, may be modified to operate as described in connection with FIGS. 3A through 3N, and in connection with the test runs A, B, and C in FIGS. 4 through 6. Such modifications may be performed in a relatively inexpensive manner by adjusting programming of an ECM or other engine control instructions. Combustion may be initiated during the compression stroke of an idling aircraft diesel engine, and idling power output of that engine reduced, by advancing fuel injection, splitting fuel injection, and/or manipulating individual injection quantities. Extensive modifications to valves and/or other engine components may be unnecessary.

For the avoidance of doubt, the present application includes, but is not limited to, the subject-matter described in the following numbered clauses:

1. A method comprising, for each of one or more cylinders of a 4-stroke diesel engine: performing an intake stroke by moving a piston in the cylinder between a top dead center (TDC) position and a bottom dead center (BDC) position, wherein the intake stroke is part of a cycle comprising a compression stroke, following the intake stroke, in which the piston moves between the BDC position and the TDC position, an expansion stroke, following the compression stroke, in which the piston moves between the TDC position and the BDC position, and an exhaust stroke, following the expansion stroke, in which the piston moves between the BDC position and the TDC position; performing the compression stroke, wherein the performing the compression stroke comprises injecting fuel into the cylinder and initiating, during the compression stroke, combustion of the fuel, and wherein at least 10% of a total mass of the fuel combusted in the cylinder during the cycle is combusted during the compression stroke; performing the expansion stroke, wherein the performing the expansion stroke comprises continuing, while intake and exhaust valves of the cylinder are closed, combustion of the fuel; and performing the exhaust stroke.

2. The method of clause 1, wherein the engine is an engine of an aircraft.

3. The method of any of clauses 1-2, wherein the method is performed while the aircraft is at an altitude of at least 15,000 feet above sea level.

4. The method of any of clauses 1-3, wherein the method is performed while the aircraft is at an altitude of at least 20,000 feet above sea level.

5. The method of any of clauses 1-4, wherein the method is performed while the aircraft is at an altitude of at least 25,000 feet above sea level.

6. The method of any of clauses 1-5, wherein the method is performed while the engine is idling.

7. The method of any of clauses 1-6, wherein the injecting the fuel into the cylinder comprises injecting a quantity of fuel that is between $f_{MIN}$ and $1.10*f_{MIN}$, and wherein $f_{MIN}$ is a minimum quantity of fuel required to maintain stable combustion in the cylinder.

8. The method of any of clauses 1-7, wherein the injecting the fuel into the cylinder comprises injecting the fuel so that a total quantity, of fuel injected into the cylinder during the cycle, is injected in multiple injections occurring during the compression stroke.

9. The method of any of clauses 1-8, wherein the engine comprises turbocharger.

10. The method of any of clauses 1-9, the performing the expansion stroke comprises performing the expansion stroke without injecting fuel into the cylinder during the expansion stroke.

11. The method of any of clauses 1-10, wherein at least 10% of the total mass of the fuel combusted in the cylinder during the cycle is combusted during the compression stroke.

12. The method of any of clauses 1-11, wherein at least 15% of the total mass of the fuel combusted in the cylinder during the cycle is combusted during the compression stroke.

13. The method of any of clauses 1-12, wherein at least 20% of the total mass of the fuel combusted in the cylinder during the cycle is combusted during the compression stroke.

14. The method of any of clauses 1-13, wherein at least 25% of the total mass of the fuel combusted in the cylinder during the cycle is combusted during the compression stroke.

15. The method of any of clauses 1-14, wherein at least 30% of the total mass of the fuel combusted in the cylinder during the cycle is combusted during the compression stroke.
16. The method of any of clauses 1-15, wherein at least 35% of the total mass of the fuel combusted in the cylinder during the cycle is combusted during the compression stroke.
17. A method comprising: operating a 4-stroke diesel engine at a first shaft output power, wherein, for each of one or more cylinders of the engine: a cycle comprises an intake stroke in which a piston moves in the cylinder between a top dead center (TDC) position and a bottom dead center (BDC) position, a compression stroke, following the intake stroke, in which the piston moves between the BDC position and the TDC position, an expansion stroke, following the compression stroke, in which the piston moves between the TDC position and the BDC position, and an exhaust stroke, following the expansion stroke, in which the piston moves between the BDC position and the TDC position, and a first percentage of a first total mass of fuel combusted, during each cycle at the first shaft output power, is combusted during the compression stroke; and operating the engine at a second shaft output power, wherein, for each of the one or more cylinders of the engine: a second percentage of a second total mass of fuel combusted, during each cycle at the second shaft output power, is combusted during the compression stroke, the second shaft output power is less than the first shaft output power, and the second percentage is higher than the first percentage.
18. The method of clause 17, wherein the engine is an engine of an aircraft.
19. The method of any of clauses 17-18, wherein the second percentage is at least 10%.
20. The method of any of clauses 17-19, wherein the second percentage is at least 15%.
21. The method of any of clauses 17-20, wherein the second percentage is at least 20%.
22. The method of any of clauses 17-21, wherein the second percentage is at least 25%.
23. The method of any of clauses 17-22, wherein the second percentage is at least 30%.
24. The method of any of clauses 17-23, wherein the second percentage is at least 35%.
25. The method of any of clauses 17-24, wherein the operating the engine at the second shaft output power comprises operating the engine while the aircraft is at an altitude of at least 15,000 feet above sea level.
26. The method of any of clauses 17-25, wherein the operating the engine at the second shaft output power comprises operating the engine while the aircraft is at an altitude of at least 20,000 feet above sea level.
27. The method of any of clauses 17-26, wherein the operating the engine at the second shaft output power comprises operating the engine while the aircraft is at an altitude of at least 25,000 feet above sea level.
28. The method of any of clauses 17-27, wherein the operating the engine at the second shaft output power comprises idling the engine.
29. A method comprising: for each of one or more cylinders of a 4-stroke diesel engine: combusting, in the cylinder during a compression stroke, a first portion of a total mass of fuel combusted during a cycle comprising the compression stroke; and combusting, in the cylinder during an expansion stroke immediately following the compression stroke, a second portion of the total mass of fuel combusted during the cycle, wherein the first portion is at least 10% of a sum of the first and second portions.
30. The method of clause 29, wherein the engine is an engine of an aircraft.
31. The method of any of clauses 29-30, wherein the first portion is at least 15% of the sum of the first and second portions.
32. The method of any of clauses 29-31, wherein the first portion is at least 20% of the sum of the first and second portions.
33. The method of any of clauses 29-32, wherein the first portion is at least 25% of the sum of the first and second portions.
34. The method of any of clauses 29-33, wherein the first portion is at least 30% of the sum of the first and second portions.
35. The method of any of clauses 29-34, wherein the first portion is at least 35% of the sum of the first and second portions.
36. The method of any of clauses 29-35, wherein, for each of the one or more cylinders, no fuel is injected into the cylinder during the expansion stroke.
37. The method of any of clauses 29-36, wherein the method is performed while the engine is idling.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:
1. An engine control module comprising:
one or more processors; and
memory storing instructions that, when executed by the one or more processors, cause the engine control module to receive input data regarding a 4-stroke diesel aircraft engine and to output fuel injector control signals that cause, for each of one or more cylinders of the engine:
performance of an intake stroke in which a piston moves in the cylinder between a top dead center (TDC) position and a bottom dead center (BDC) position, wherein the intake stroke is part of a cycle comprising a compression stroke, following the intake stroke, in which the piston moves between the BDC position and the TDC position, an expansion stroke, following the compression stroke, in which the piston moves between the TDC position and the BDC position, and an exhaust stroke, following the expansion stroke, in which the piston moves between the BDC position and the TDC position;
performance of the compression stroke, wherein the compression stroke comprises injection of fuel into the cylinder and combustion, by initial ignition of the fuel using heat from air compression, of at least 10% of a total mass of the fuel combusted in the cylinder during the cycle;

performance of the expansion stroke, wherein the expansion stroke comprises continued combustion of the fuel while intake and exhaust valves of the cylinder are closed; and performance of the exhaust stroke.

2. The engine control module of claim 1, wherein the instructions, when executed, cause the engine control module to:

receive the input data by receiving the input data while an aircraft comprising the engine is at an altitude of at least 15,000 feet above sea level; and output the control signals by outputting the control signals while the aircraft is at the altitude of at least 15,000 feet above sea level.

3. The engine control module of claim 1, wherein the instructions, when executed, cause the engine control module to:

receive the input data by receiving the input data while the engine is idling; and output the control signals by outputting the control signals while the engine is idling.

4. The engine control module of claim 3, wherein the injection of the fuel into the cylinder comprises injecting a quantity of fuel that is between $f_{MIN}$ and $1.10*f_{MIN}$, and wherein $f_{MIN}$ is a minimum quantity of fuel required to maintain stable combustion in the cylinder.

5. The engine control module of claim 3, wherein the injection of the fuel into the cylinder comprises injecting the fuel so that a total quantity, of the fuel injected into the cylinder during the cycle, is injected in multiple injections occurring during the compression stroke.

6. The engine control module of claim 3, wherein the engine comprises a turbocharger.

7. The engine control module of claim 1, wherein the performance of the expansion stroke comprises performing the expansion stroke without injecting fuel into the cylinder during the expansion stroke.

8. The engine control module of claim 1, wherein at least 15% of the total mass of the fuel combusted in the cylinder during the cycle is combusted during the compression stroke.

9. The engine control module of claim 1, wherein at least 25% of the total mass of the fuel combusted in the cylinder during the cycle is combusted during the compression stroke.

10. An engine control module comprising:

one or more processors; and memory storing instructions that, when executed by the one or more processors, cause the engine control module to receive input data regarding a 4-stroke diesel aircraft engine and to output fuel injector control signals that cause, for each of one or more cylinders of the engine:

operation of the engine at a first shaft output power, wherein, for each of one or more cylinders of the engine:

a cycle comprises an intake stroke in which a piston moves in the cylinder between a top dead center (TDC) position and a bottom dead center (BDC) position, a compression stroke, following the intake stroke, in which the piston moves between the BDC position and the TDC position and in which fuel is initially ignited using heat from air compression, an expansion stroke, following the compression stroke, in which the piston moves between the TDC position and the BDC position, and an exhaust stroke, following the expansion stroke, in which the piston moves between the BDC position and the TDC position, and a first percentage of a first total mass of the fuel combusted, during each cycle at the first shaft output power, is combusted during the compression stroke; and operation of the engine at a second shaft output power, wherein, for each of the one or more cylinders of the engine:

a second percentage of a second total mass of fuel combusted, during each cycle at the second shaft output power, is combusted during the compression stroke, the second shaft output power is less than the first shaft output power, and the second percentage is higher than the first percentage.

11. The engine control module of claim 10, wherein the second percentage is at least 20%.

12. The engine control module of claim 10, wherein the second percentage is at least 30%.

13. The engine control module of claim 10, wherein the operation of the engine at the second shaft output power comprises operating the engine while an aircraft comprising the engine is at an altitude of at least 15,000 feet above sea level.

14. The engine control module of claim 10, wherein the operation of the engine at the second shaft output power comprises idling the engine.

15. The engine control module of claim 14, wherein the operation of the engine at the second shaft output power comprises operating the engine while an aircraft comprising the engine is at an altitude of at least 15,000 feet above sea level.

16. An engine control module comprising:

one or more processors; and memory storing instructions that, when executed by the one or more processors, cause the engine control module to receive input data regarding a 4-stroke diesel aircraft engine and to output fuel injector control signals that cause, for each of one or more cylinders of the engine:

combustion, in the cylinder during a compression stroke, of a first portion of a total mass of fuel combusted during a cycle comprising the compression stroke, wherein the compression stroke comprises initial ignition of the fuel using heat from air compression; and combustion, in the cylinder during an expansion stroke immediately following the compression stroke, of a second portion of the total mass of the fuel combusted during the cycle, wherein the first portion is at least 10% of a sum of the first and second portions.

17. The engine control module of claim 16, wherein the first portion is at least 20% of the sum of the first and second portions.

18. The engine control module of claim 16, wherein the first portion is at least 30% of the sum of the first and second portions.

19. The engine control module of claim 16, wherein, for each of the one or more cylinders, no fuel is injected into the cylinder during the expansion stroke.

20. The engine control module of claim 16, wherein the instructions, when executed, cause the engine control module to:
receive the input data by receiving the input data while the engine is idling; and
output the control signals by outputting the control signals while the engine is idling.

* * * * *

UNITED STATES PATENT AND TRADEMARK OFFICE
CERTIFICATE OF CORRECTION

| | |
|---|---|
| PATENT NO. | : 11,261,821 B2 |
| APPLICATION NO. | : 17/029505 |
| DATED | : March 1, 2022 |
| INVENTOR(S) | : Rik Denis Meininger et al. |

It is certified that error appears in the above-identified patent and that said Letters Patent is hereby corrected as shown below:

On the Title Page

Item (73), After Science delete "Application" and replace with --Applications--

Signed and Sealed this
Eleventh Day of October, 2022

*Katherine Kelly Vidal*

Katherine Kelly Vidal
*Director of the United States Patent and Trademark Office*